Feb. 23, 1932.        F. ALEXANDER ET AL        1,846,242
ELECTRODE AND METHOD OF MAKING THE SAME
Filed Jan. 5, 1929
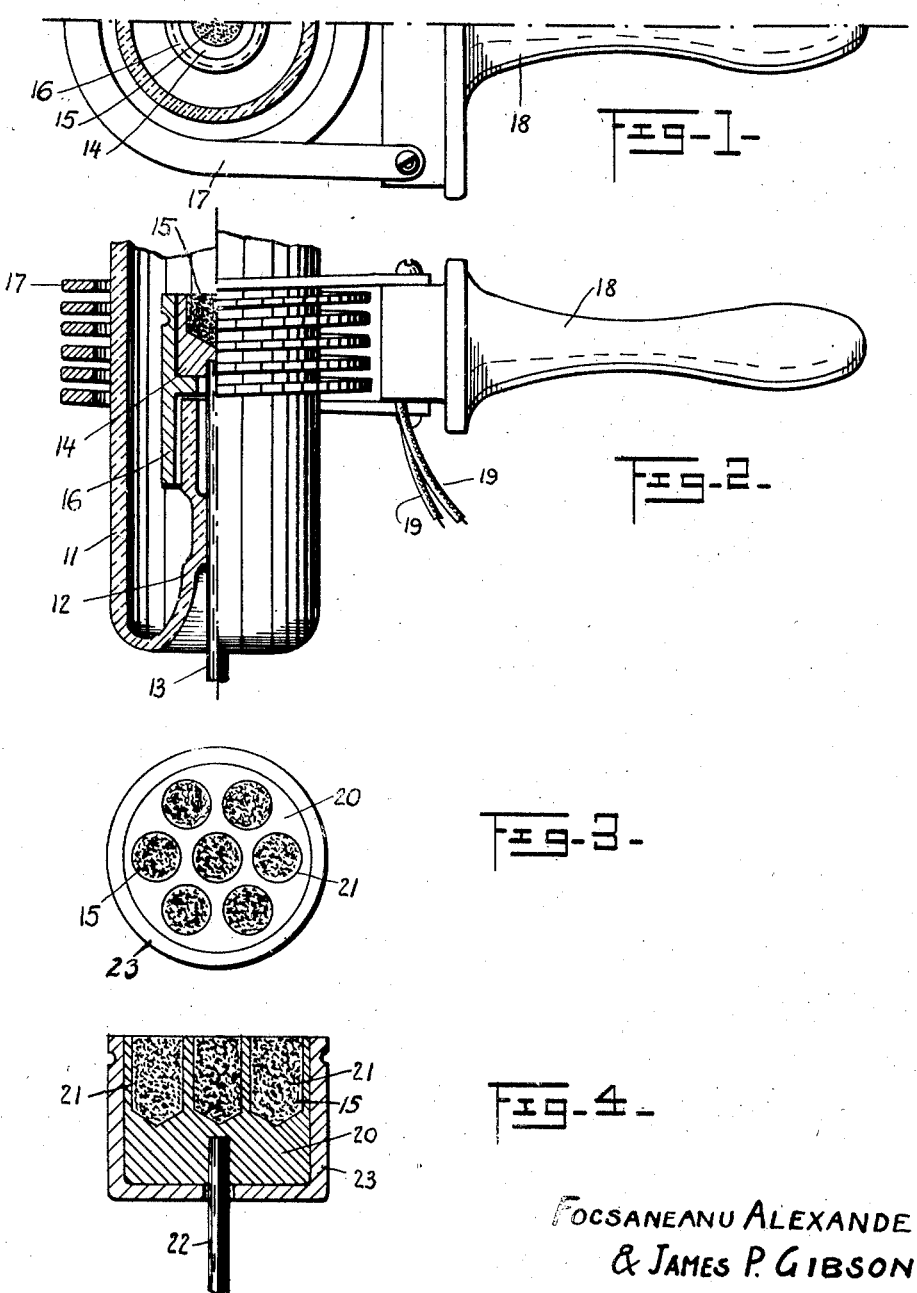
Focsaneanu Alexander
& James P. Gibson.
INVENTORS
BY *Rudolf Wildermann*
their ATTORNEY.

Patented Feb. 23, 1932

1,846,242

UNITED STATES PATENT OFFICE

FOCSANEANU ALEXANDER AND JAMES P. GIBSON, OF NEW YORK, N. Y., ASSIGNORS TO ARGCO TUBE AND TELEVISION CORPORATION, A CORPORATION OF DELAWARE

ELECTRODE AND METHOD OF MAKING THE SAME

Application filed January 5, 1929. Serial No. 330,529.

Our invention pertains to electrodes for luminescent tubes and the method of making the same; its subject is primarily the making of luminescent tubes with electrodes containing the metals of the alkalies.

It is well known to those acquainted with this art, that the metals of the alkalies are eminently fitted for the use as electrodes in luminescent tubes because their use results in a very low cathode-potential-drop. If their use has been very much limited, not to say impossible, this is due to those prohibitive characteristics of comparatively low melting points and of softness and incoherence, which are shared by all the metals of that group. Fortunately the advantage of the low potential drop of electrodes made out of these metals extends also to their oxides which, though not substantially superior to the pure metals in respect to coherence, have a higher melting point and a solid crystalline structure. We have succeeded in producing and adapting the oxides of these metals as well as the metals themselves to use as electrodes in luminescent tubes. That adaptation has been the prime object of our invention. We have had various other objects in view, some of which are, first, to provide suitable containers for electrodes made out of such metals; second, to provide means to reduce in the rarefied atmosphere, which is produced in the manufacture of a luminescent tube, compositions of these metals to simple compounds which are best fitted for electrode use; third, to degasify said compositions before they are converted into suitable electrodes; fourth, to reduce the electrode material to a state of coherence and compactness at the point where it is to be used as an electrode; fifth, to provide means for going through the above processes without splashing and unduly vaporizing the materials; sixth, to apply the above process in a uniform manner to the whole mass of the electrode material; seventh, to produce an electrode of said materials which is suitably held together and supported for the permanent use in a luminescent tube; eighth, to extend this method to the making of and to the use in electrodes made of metals of low cathode-potential-drop, which are also classified as substantially nonsputtering metals.

These and other objects we attain by the means set forth in the following specification and in the accompanying drawings, in which—

Figure 1 shows the substantially bi-sected top view of the end of a luminescent tube which contains an electrode of our invention. A high frequency coil is shown around the tube, in a position for treating the electrode material.

Figure 2 shows a corresponding side view of the parts of Figure 1, in which a 90 degree sector has been cut away to show the arrangement of our electrode on the inside of a tube.

Figure 3 shows a top view of a large electrode in which our invention is incorporated.

Figure 4 shows a corresponding sectioned side view.

Similar numerals refer to similar parts throughout the various views.

In Figures 1 and 2 our invention is shown mounted on the inside of a tube 11, supported by a stem 12, which is fused into the tube and into which is fused the conductor 13 which carries the current to the electrode. To the end of the conductor 13 is attached, in the tube, the container 14 which is made out of iron or other metals which are suited to be heated up by eddy-currents inductively generated therein. This container 14 is filled with our electrode material 15. A refractory re-enforcing and protective sleeve 16 is slipped over the end of the stem 12 and retains in its upper end the container 14.

The high frequency coil 17 is mounted upon the handle 18 by means of which the operator holds it in a position suitable for processing the electrode material. Cables 19 connect the high frequency coil to a suitably controlled source of high frequency current.

The electrode shown in Figures 3 and 4 shows a larger container 20 with a multiplicity of openings 21 in which is retained our electrode material 15. A conductor 22 serves to connect the container 20, through the wall of the tube, to the source of current. Corresponding to the arrangement of sleeve 16 in Figures 1 and 2 refractory material 23 suitably encloses the sides and the bottom of container 20.

We carry through our invention in the following manner:

As a basis for the electrode material we use salts of the metals of the alkalies which can readily be reduced to simpler salts or oxides. Such materials are the silicates, nitrates, alums, or similar salts of the metals of the alkalies. These materials are mixed with a small quantity of suitable reducing agents, such as aluminum, magnesium, etc., in powdered form. The mixture is suitably packed into the container 14 or into the container 20 which are provided with means for supplying current to the electrodes by the conductors 13 or 22, respectively. Over the container 14 or 20 is slipped the sleeve 16 or 23, respectively, and this intended electrode is mounted in a stem which in turn is mounted in the end of the tube which forms the enclosure of the luminescent tube, according to the practice of making such tubes. The packing of the material may of course take place after the container has been mounted in the stem as well as before it is so mounted.

The stems described are mounted in the ends of the tube and then the tube is evacuated and filled with the luminescent gas in the manner well known to those acquainted with the respective art.

During the evacuation we perform our process of reduction and solidification of the material in the container. For this purpose a high frequency coil as shown in Figures 1 and 2 is slipped over the tube, into alignment with the container, and the coil is excited by high frequency currents supplied from a suitable source connected to the wires 19. The high frequency generator is provided with suitable controls to regulate the amount of current introduced as well as to limit the period of time during which high frequency currents are applied. The high frequency currents in coil 17 inductively set up eddy-currents in the container which is heated up and also heats up the material 15 in said container. The composition of a metal of the alkalies which, mixed with the reducing agent, is held in the container, goes through a chemical reaction under the heat transmitted to it from the container, the metal composition is reduced to a simple salt, to the oxide of the metal of the alkalies and some of it even to the metal itself, and that composition is at the same time degasified and fused or sintered into a solid block which is firmly located on the inside of the container. After the tube is finished the discharge between opposite electrodes takes place from the surface of the contents of the container of one to the surface of the contents of the container of the other, the electric current choosing that path on account of the low potential drop on said contents.

Electrodes thus produced may of course be constructed in various modifications and the method of making the electrode may be altered in various ways, such constructions and manufacturing methods all falling within the scope of our invention. We therefore do not want to limit ourselves to the exact process and product described and shown but we desire protection of our invention as far as it represents improvements over the prior art and within the limitations of the appended claims.

We claim:

1. The method of making an electrode of a substantially non-sputtering metal composition for a luminescent tube, consisting of depositing a mixture of a salt of said metal and of a reducing agent in a conductive container in said tube, rarefying the atmosphere in said tube, and bringing said container in said rarefied atmosphere to heat by setting up eddy-currents therein by inductively coupling said container to a coil carrying high frequency currents, said heat being transmitted to said mixture and reducing it to a state suitable for electrode use.

2. The method of making an electrode of a substantially non-sputtering metal composition for a luminescent tube, consisting of depositing a mixture of a salt of said metal and of a reducing agent in a conductive container surrounded by a refractory heat insulating material in said tube, rarefying the atmosphere in said tube, and bringing said container in said rarefied atmosphere to heat by setting up eddy-currents therein by inductively coupling said container to a coil carrying high frequency current, said heat being transmitted to said mixture and reducing it to a state suitable for electrode use.

3. The method of making an electrode of a substantially non-sputtering metal composition for a luminescent tube, consisting of depositing a mixture of a compound of said metal and of a reducing agent in a conductive container in said tube, rarefying the atmosphere in said tube, bringing said container in said rarefied atmosphere to heat by setting up eddy-currents therein by inductively coupling said container to a coil carrying high frequency current, said heat being transmitted to said mixture and reducing the metal compound to an oxide suitable for electrode use, and evacuating said tube while said container is being brought to heat.

4. The method of making an electrode of a composition of a metal of the alkalies for a luminescent tube, consisting of depositing a mixture of a salt of said metal with a reducing agent in a conductive container in said tube, rarefying the atmosphere in said tube, bringing said container in said rarefied atmosphere to heat by setting up eddy-currents therein by inductively coupling said container to a coil carrying high frequency current, said heat being transmitted to said mixture and reducing said salt to said metal composition in a state suitable for electrode use, and evacuating said tube while said container is being brought to heat.

Signed at New York, in the county of New York and State of New York, this 31st day of December, A. D. 1928.

FOCSANEANU ALEXANDER.
JAMES P. GIBSON.